United States Patent
Acharya et al.

(10) Patent No.: US 12,456,945 B2
(45) Date of Patent: Oct. 28, 2025

(54) WATER BASED AUTOMATIC SOLAR PANEL CLEANING SYSTEM AND METHOD THEREOF

(71) Applicant: WEISMACHER ECO PRIVATE LIMITED, Ahmedabad (IN)

(72) Inventors: Rajeshkumar Hariprasad Acharya, Ahmedabad (IN); Yusuf Nazmuddin Ghadiali, Ahmedabad (IN)

(73) Assignee: WEISMACHER ECO PRIVATE LIMITED, Ahmedabad (IN)

( * ) Notice: Subject to any disclaimer, the term of this patent is extended or adjusted under 35 U.S.C. 154(b) by 420 days.

(21) Appl. No.: 18/044,393

(22) PCT Filed: Sep. 7, 2021

(86) PCT No.: PCT/IN2021/050871
§ 371 (c)(1),
(2) Date: Mar. 8, 2023

(87) PCT Pub. No.: WO2022/054082
PCT Pub. Date: Mar. 17, 2022

(65) Prior Publication Data
US 2023/0353084 A1      Nov. 2, 2023

(30) Foreign Application Priority Data

Sep. 8, 2020   (IN) ............................ 202021038744
Aug. 27, 2021  (IN) ............................ 202121038901

(51) Int. Cl.
*H02S 40/10*   (2014.01)
*B08B 3/02*    (2006.01)

(52) U.S. Cl.
CPC ............... *H02S 40/10* (2014.12); *B08B 3/02* (2013.01)

(58) Field of Classification Search
CPC ....................................................... H02S 40/10
See application file for complete search history.

(56) References Cited

U.S. PATENT DOCUMENTS

| 8,771,432 B2 | 7/2014 | Meller et al. |
| 2009/0288691 A1 | 11/2009 | Hunt et al. |
| 2017/0070189 A1 | 3/2017 | Hartman |

FOREIGN PATENT DOCUMENTS

| KR | 101395048 B1 | 5/2014 |
| KR | 101589540 B1 | 2/2016 |

(Continued)

OTHER PUBLICATIONS

First Examination Report of Indian Patent Application issued in Indian Application No. 202021038744, dated Oct. 21, 2021.
(Continued)

*Primary Examiner* — Jason Y Ko
(74) *Attorney, Agent, or Firm* — Benesch Friedlander Coplan & Aronoff LLP

(57) ABSTRACT

The present invention relates to a water based automatic solar panel cleaning system and method thereof. It describes an improved solar panel cleaning system which cleans the solar panels in fully automatic and economical way. The system comprises plurality solenoid valve (1) is connected to a water tank (3) through a main pipe (2), a pump (4) and a valve (5). Second end of the solenoid valves (1) are connected to a respective outlet pipe (6). The outlet pipe (6) is extended to connect with a means for spraying it will act as water spraying. The system includes a step down transformer, micro controller and timer for controlling the operation of the solenoid valves (1) so that the solenoid valves get ON and OFF at predetermined time interval. The solar panel gets cleaned with predetermined time interval through the means for spraying of water automatically.

8 Claims, 3 Drawing Sheets

(56) References Cited

FOREIGN PATENT DOCUMENTS

| KR | 20190133355 A | 12/2019 |
|----|---------------|---------|
| WO | 2015068881 A1 | 5/2015  |
| WO | 2019168335 A1 | 9/2019  |

OTHER PUBLICATIONS

International Search Report and Written Opinion issued in International Application No. PCT/IN2021/050871, mailing date Nov. 30, 2021.
"Fully Automatic Solar Panel Washing Plan with daily time and Deep well submersimble pump", Jagat Pavasia, Youtube, Jan. 30, 2019, last retrieved Oct. 8, 2024 from "https://www.youtube.com/watch?v=mzeW7CohPxl&t=16s".
Extended European Search Report issued in European Application No. 21866241.9, dated Apr. 15, 2024.

WATER BASED AUTOMATIC SOLAR PANEL CLEANING SYSTEM AND METHOD THEREOF

The present invention is a combination of Provisional Patent Application No. 202021038744 Filed on Sep. 8, 2020 and Provisional Patent Application No. 202121038901 Filed on Aug. 27, 2021.

FIELD OF INVENTION

The present invention relates to a solar panel cleaning system and method thereof. More particularly it relates to water based automatic solar panel cleaning system with automatic timer operated that is easy to install and effectively clean the surface of solar panels.

BACKGROUND OF INVENTION

With the strong support of the government, the domestic solar power industry has developed rapidly in recent years, and solar power production has also increased significantly. Currently, the use of solar panels for the collection of solar energy is a common practice. Obviously, these solar panels are installed outdoors in order to achieve a direct impact from the solar light, and when dealing with facilities of a certain scope, in the countryside or rural areas. Given that solar panels are kept at a slope, which can be variable or fixed, dust and particles in suspension are left on the surface of the solar panel, forming a layer or film which makes the impact of the solar rays on the surface of the solar panel difficult and consequently considerably reduces its performance.

Solar energy is as inexhaustible, inexhaustible first clean energy resource become the emphasis that countries in the world are competitively developed, solar energy power generating has safe and reliable, pollution-free, the advantages such as noiseless. Solar energy industry has become one of the fastest emerging industry of global evolution, but simultaneously also to there is density low for solar energy, intermittent, the problems such as direction of illumination and intensity time constantly change, the photoelectric converting device of photovoltaic generating system array type solar cell panel, the fixed installation of many employing, can not the change of real-time tracing position of sun, cause lighting efficiency lower, affect photoelectric conversion efficiency, in addition, because cell panel surface is fully exposed in outdoor air, along with time integral, inorganic and organic dust in air can be accumulated in its surface gradually, both the energy conversion efficiency of battery had been reduced, also easily damage because "tropical island effect" causes battery local pyrexia, solar storage battery is caused greatly to shorten the life-span.

As most solar parks or other installations and concentrations of solar panels are located in desert areas where the sun's radiation is intensive and exposure to dusty conditions is high, cleaning the solar panels becomes essential. Solar panel surfaces are typically made of high quality glass and the efficiency of the renewable energy they generate depends, among other things, on the cleanliness of the glass surfaces. Due to dust and other type of dirt and/or debris on the surfaces of the solar panels, energy losses, in some cases, can reach over forty percent (40%).

Well known method to remove dirt and other elements while maximizing the potential efficiency of solar panels and preventing a decrease in efficiency is to clean the solar panels. Presently, solar panels may be cleaned in a similar manner as cleaning a window panel. However, because solar panels are sometimes located in hard to reach areas such as on a slanted rooftop, the chore of climbing to the rooftop to clean a solar panel system is burdensome and often times dangerous. Additionally, some solar panel systems include a large quantity of individual solar panels. Cleaning each individual solar panel may consume too much time.

Various prior arts have been disclosed describing cleaning of solar panel. The prior art document EP 2048455 discloses the system includes longitudinal rails (1), cleaning brushes (3), a drive unit (2) mounted with possibility of linear displacement along the longitudinal rails (1) and provided with at least one motor element (4) for the rotational actuation of the cleaning brushes (3) and the movement of said cleaning brushes (3), together with the drive unit (2), along the longitudinal rails (1), an electric control panel (5) and a rain sensor (6) for the automatic start-up of the drive unit (2).

Another prior art document U.S. Pat. No. 8,771,432 relates to the system and method for cleaning rows of solar panels. Each solar row has an upper edge elevated above ground level and a lower edge to provide an inclination of the solar row. A cleaning assembly cleans the solar panel surfaces. A support frame supports the cleaning assembly and enables upward and downward motion in the width and length directions of the solar row. Operation and movement of the cleaning assembly is controlled so as to clean a surface of the solar panels during downward movement. The cleaning assembly is preferably not operative during upward movement. During downward movement, the cleaning assembly removes dirt, debris and dust from the surface of the solar panels and generates an air stream to blow off the dirt, debris, and dust. The system includes a guide system for moving the cleaning assembly to align with successive solar panel rows.

The above mentioned prior art exists complicated structure in the dust cleaning device of the solar panel surface. The self-cleaning solar panel device has a complicated structure, has no air blowing washing device, has poor practicability, and has a small application range. These low-level deficiencies provide a kind of dry cleaning. Therefore, the solar panel is more and more unclean; there is no water-making device, which limits the scope of application of the solar panel cleaning device, and the degree of intelligent automation is not high.

Overall, after using the solar panel for a period of time, there is a reality that the power generation effect is poor. For this reason, a large part of the reason is due to the ash accumulation on the solar panel or the growth of moss, etc., resulting in poor lighting effect. In order to achieve an optimal performance of the solar panel it is necessary to clean it periodically and eliminate the dirt accumulated there upon. This operation is currently carried out manually, which poses several drawbacks, such as: high maintenance personnel costs, risk of accidents of the operators who have to use ladders or other lifting means to access the surface of the panel and the drawback of transporting tools and water or other cleaning products to the area where the panels are located.

Therefore, there is a need to be solution in the art for a solar panel cleaning system. Hence, it is of great significance to invent automatic solar panel cleaning system. This need is addressed by the present invention, as will be described in more detail below.

OBJECT OF INVENTION

The main object of the present invention is to provide water based automatic solar panel cleaning system.

Another object of the present invention is to specifically addresses and alleviates the above-identified deficiencies in the art.

The further object of the present invention is to provide automatic timer operated cleaning system and operational even at high temperature.

Another object of the present invention is to provide less water used for cleaning, less cleaning time, water resistant and less power consumption.

Yet another object of the present invention is to provide water based automatic solar panel cleaning system that will require minimal maintenance and supervision with low construction cost.

The further object of the present invention is to provide a maximum cleaning with minimum use of water, reduce strain and require less space with low water consumption.

Another object of the present invention is to provide water based automatic solar panel cleaning system that will make the solar panel cleaning process fully automatic, cost effective and economical.

Still another object of the present invention is to provide water based automatic solar panel cleaning system which have higher energy production, extend life span and increase efficiency.

SUMMARY OF INVENTION

The present invention relates to a water based automatic solar panel cleaning system and method thereof. The present invention describes an improved solar panel cleaning system which cleans the solar panels in fully automatic and economical way. The system comprises plurality solenoid valve which is connected to a water tank through a main pipe, a pump and a valve. Second end of the solenoid valves are connected to a respective outlet pipe. The outlet pipe is extended to connect with a means for spraying it will act as water spraying. The system further comprises a step down transformer, micro controller and timer for controlling the operation of the solenoid valves so that the solenoid valves get ON and OFF at predetermined time interval. The solar panel gets cleaned with predetermined time interval through the means for spraying of water automatically.

BRIEF DESCRIPTION OF DRAWINGS

Objects and advantages of the invention will be apparent from the following detailed description taken in conjunction with the accompanying figure of the drawing wherein.

BRIEF DESCRIPTION OF INVENTION

The nature of the invention and the manner in which it works is clearly described in the specification. The invention has various embodiments and they are clearly described in the following pages of the complete specification. Before explaining the present invention, it is to be understood that the invention is not limited in its application.

Figure 1:
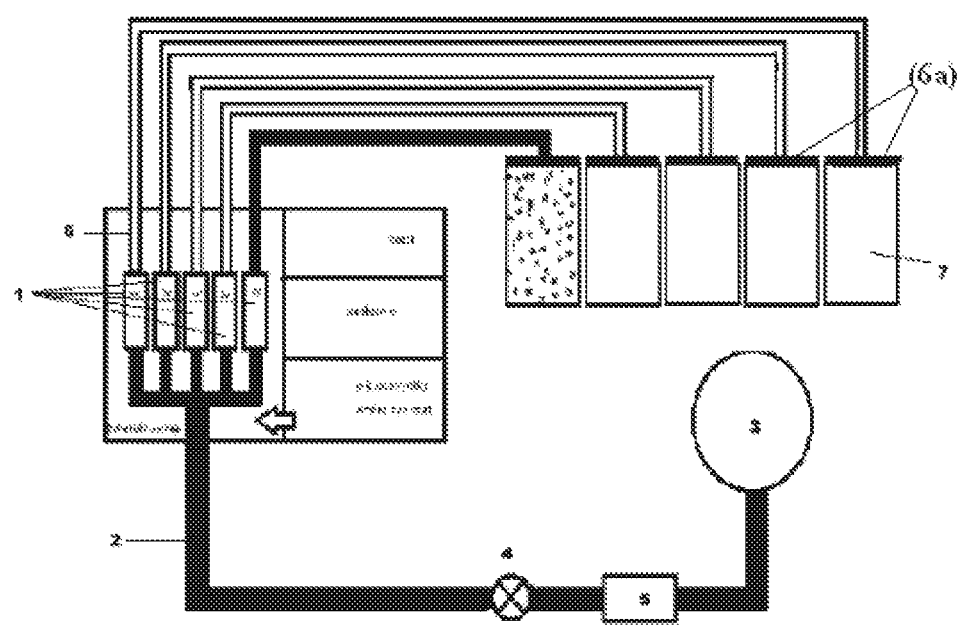
FIG. 1 illustrates a schematic view of the water based automatic solar panel cleaning system according to present invention.

Now as shown in FIG. 1, water based automatic solar panel cleaning system according to the present invention comprises a plurality of solenoid valve (1), each solenoid valve (1) is connected to a main pipe (2) as its first end. This main pipe (2) is configured to receive fluid (water) from a water tank (3) outlet through a pump (4) and a valve (5). The water tank (3) is used to store the water that are installed under a solar panel (7), the design of the water tank (3) in such way that it maximize the water source cleaning and provide sufficient water for cleaning. The main pipe (2) having an incoming end that receives the water from the water tank (3) and an outgoing end that is connected with the first end of each solenoid valve (1).

Referring continuous with as per FIG. 1, a second end of the each solenoid valve (1) is connected to a respective outlet pipe (6). The outlet pipe (6) is extended to connect with a means for spraying being located on the surface of the solar panel (7). Thus, one solenoid valve (1) and respective outlet pipe is configured to dispense the water on the surface of the one solar panel (7) through the respective means for spraying. Said means for spraying sprinkles water automatically on the solar panel (7) so that belonging solar panel (7) will get cleaned. The outlet pipe (6) is made with UPVC pipe and fittings.

Figure 2:
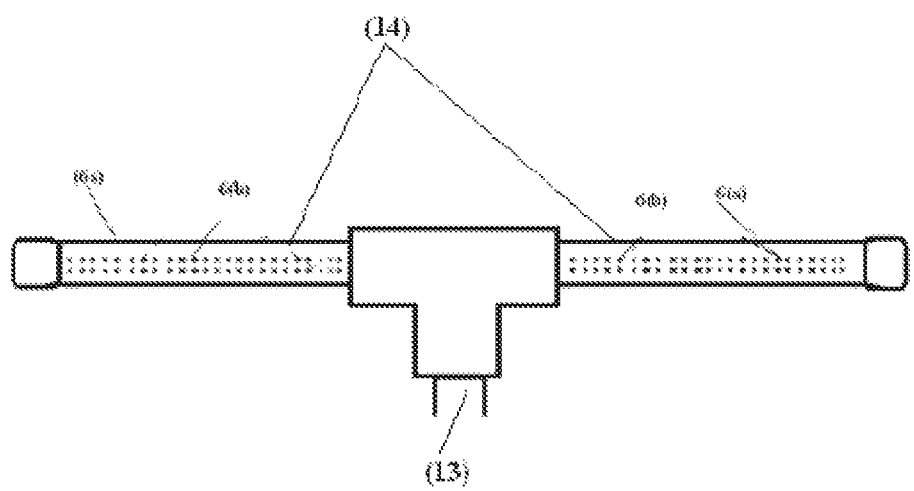
FIG. 2 illustrates the schematic view of the water spraying pipe according to present invention mention in FIG. 1.

In a preferred embodiment of the present invention, the means for spraying includes a water spraying pipe (6a) located on the each solar panel (7) and is in fluidly communication with the respective outlet pipe (6) as shown in FIG. 1. Referring now FIG. 2 the water spraying pipe (6a) having a water inlet (13) being connected to the respective outlet pipe (6) and a spraying section (14) being drilled with small holes (6b) such that it will act as water spraying gun. Now, as per the FIG. 2 of the present invention, the small holes (6b) are formed along the length of the water spraying pipe (6a) that sprays water automatically on to the surface of the solar panel (7). Furthermore, various shapes are suitable for the small holes (6b) includes round, oval and rectangular. The small holes (6b) are drilled in such way to improve the distribution of the water on the surface of the solar panel (7) that improves the washing efficiency by maximum cleaning with minimum use of water. Further, the length of spraying section (14) is kept sufficiently long so that it can wash the entire width of the solar panel (7).

Figure 3:
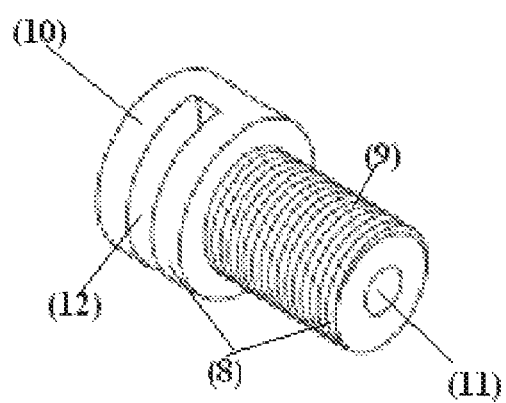
FIG. 3 illustrates the schematic view of the sprayer according to present invention.

Now, according to another embodiment of the present invention, the means for spraying includes a sprayer (8). Now, as shown in FIG. 3, the sprayer (8) consist of a tubular thread member (9) and a circular member (10). Furthermore, the tubular thread member (9) is formed with a conical shape hollow channel (11) that allows the water to pass through it. First end of the conical shape hollow channel (11) is in fluidly communication with the respective outlet pipe (6). Second end of the conical shape hollow channel (11) is open in middle of the circular member (10). Here, the diameter of the first end of end of the conical shape hollow channel (11) is comparatively larger than the diameter of the second end thereof. Due to this configuration, the pressurized water flow is created and sprinkled onto the surface of the solar panel (7).

Further, the circular member (10) has a curved cut (12) to spray water in curved form. Second end of the conical shape hollow channel (11) opens in the curved cut that distributes the water uniformly over the surface or space to be cleaned on the solar panel (7). Further, said sprayer (8) sprays the water automatically in curved form on the solar panel (7) which covers the whole surface of the solar panel (7) to be cleaned more efficiently.

In preferred embodiment, a diameter of the first end of the conical shape hollow channel (11) is 8 mm and the diameter of the second end is 4 mm. The range of the circular member (10) has 30 mm in size. Furthermore, the height of the tubular thread member (9) is flexible as per the requirements means small sprayers to very large sprayers in size that helps to fit into the outlet pipe (6). The sprayer (8) is also made with the UPVC pipe and fittings. It is to be noted that the dimensions are also possible other than described herein without departing from the scope of the present invention.

Furthermore, the solenoid valves (1) are operatively connected with control panel. The control panel comprises a step down transformer, a microcontroller and a timer. Further, the solenoid valves (1) are operated such that the water will flow through it whenever a rated voltage is applied to it. This supply is controlled by the microcontroller and a relay circuit as described herein.

The step down transformer is designed to reduce the voltage from primary to secondary. It decreases the incoming current's voltage. The step down transformer converts the 230 VAC to a desired level. This voltage is then converted into a DC voltage. This DC voltage is applied to the timer is a specialized type used for measuring a predetermined time intervals. A device which counts down from the predetermined time interval is more usually a timer. The term "predetermined" refers to set a time in advance that provides the basis for activation of valves (1). Specific example is time interval (i.e. date, date/hour/minute, etc) or absolute time.

According to the present invention, the timer gives an indication of the time intervals which will be predetermined for turning ON the microcontroller for the predetermined time interval. Furthermore, the microcontroller controls the entire process and the microcontroller is programmed to set the predetermined time interval for activating the valve (1). The valve (1) is controlled by the controller. The controller is in electrical communication with the valve (1). Simultaneously, it will turn ON one of the solenoid valves (1), so that the high pressure water will flow from pump (4) to the means for spraying through the solenoid valve (1) and the outlet pipe (6). During this predetermined time interval, rest of solenoid valves (1) remain OFF condition.

After the predetermined time interval, one of the remaining solenoid valves (1) will be opened keeping previous valve and other solenoid valves (1) are closed. Simultaneously at a particular time, single solenoid valve (1) is opened and other are closed, so whole water pressure created by the pump (4), is applied to the means for spraying through the outlet pipe (6) to spray water through the water spraying pipe (6a) or the sprayer (8) on the surface of the solar panel (7) automatically as per FIGS. 1, 2 and FIG. 3. This high water pressure will clean solar panel (7) automatically which belongs to that the means for spraying.

Now, in accordance with the method for water based automatic solar panel cleaning according to the present invention, first the time interval for which the solenoid valves (1) to be operated is preferred in the timer. The timer indicates the time intervals of predetermined time interval. At predefined time interval, the microcontroller send signal to any one of solenoid valve (1). Upon receiving an electrical signal from the controller, said solenoid valve (1) opens to allow the water to flow from the main pipe (2) to the outlet pipe (6) and to the spraying means. At this time, rest of valves (1) will remain in close position. The water pressure created by the pump (4) in the solenoid valves (1) is applied to means for spraying through the respective outlet pipe (6). Thus, the water is sprayed through the means for spraying on the surface of solar panel (7).

If the water spraying pipe (6a) according to present invention is employed, in such case the water is sprinkled on the surface of solar panel (7) through the small holes (6b) made on the spraying section. In alternate mode, if the sprayer (8) is employed as means for spraying, in such case the pressurized water coming from the outlet pipe (6) is passed through the cone shaped channel and sprayed from the curved cut on the surface of the solar panel (7). After predefined time interval, the micro controller sends the signal to the solenoid valve (1) and accordingly the valve (1) is closed.

Then after, the micro controller activates another solenoid valve (1) in order to clean another solar panel (7). Again, aforementioned process is carried out to clean second solar panel (7). Thus, the solar panels (7) are automatically cleaned by high water pressure belongs to the means for spraying.

The present invention is equipped with the automatic solar panel cleaning system and method, which can be used in any area and the range of application of the cleaning system, is increased. The present invention doesn't use any of the chemicals for cleaning. The fully automatic cleaning system and method have high energy production, it extend the life span and also increase efficiency. The present invention is simple in structure, no complicated manufacturing process, strong reliable, energy conservation and can achieve the effect of automatic cleaning, economical and easy to promote.

Although the preferred embodiment as well as the preparation and use have been specifically described, it should be understood that variations in the preferred embodiment could be achieved by a person skilled in the art without departing from the spirit of the invention. The invention has been described with reference to specific embodiment which is merely illustrative and not intended to limit the scope of the invention as defined in the claims.

LIST OF REFERENCE NUMERALS (1) Solenoid valve
(2) Main pipe
(3) Water tank
(4) Pump
(5) Valve
(6) Outlet pipe
(6a) water spraying pipe
(6b) Small holes
(7) Solar panel
(8) Sprayer
(9) Tubular thread member
(10) Circular member
(11) Conical shape hollow channel
(12) Curved cut
(13) Water inlet
(14) Spraying section

We claim:
1. A water based automatic solar panel cleaning system comprises a plurality of solenoid valves (1), a control panel being operatively connected with the solenoid valves (1) and a means for spraying being located on a surface of the solar panel (7);
 the solenoid valve (1) having a first end and a second end, first end is connected to a water tank (3) filled with the water through a main pipe (2), a valve (5) and a pump (4);
 the main pipe (2) having an incoming end that receives water from the water tank (3) and an outgoing end that is connected with the first end of the each solenoid valve (1);

the second end of the each solenoid valve (1) is connected to a respective outlet pipe (6);

the outlet pipe (6) is extended to connect with the means for spraying;

the means for spraying includes a water spraying pipe (6a) and sprayer (8); the water spraying pipe (6a) having a water inlet (13) and a spraying section (14); the water inlet (13) connected to the respective outlet pipe (6);

Characterized in that, the spraying section (14) having small holes (6b) for spraying water on the surface of the solar panel (7);

the sprayer (8) includes a tubular thread member (9) and a circular member (10); the tubular thread member (9) is formed with a conical shape hollow channel (11);

the circular member (10) is formed with a curved cut (12) to spray water in curved form.

2. The water based automatic solar panel cleaning system as claimed in claim 1 wherein the control panel includes a step down transformer, a micro controller and a timer for controlling the operation of the solenoid valves (1) in ON and OFF state for predetermined time interval.

3. The water based automatic solar panel cleaning system as claimed in claim 1 wherein the conical shape hollow channel (11) having first end being connected with the respective outlet pipe (6) and second end open in the curved cut (12) that distributes the water uniformly over the surface or space to be cleaned on the solar panel.

4. The water based automatic solar panel cleaning system as claimed in claim 1 wherein a diameter of the first end of the conical shape hollow channel (11) is comparatively larger than the diameter of the second end.

5. A method for water based automatic solar panel cleaning using the system as claimed in claim 1 comprises following step:

a) predetermine time interval for which solenoid valves (1) to be operated in timer;

b) sending signal to any one of the solenoid valve (1) by microcontroller at predefined time interval and remaining close the rest of the solenoid valve (1);

c) receiving an electrical signal from the controller by the solenoid valves (1);

d) opening the solenoid valve (1) to allow the water to flow from main pipe (2) to respective outlet pipe (6) and spraying means;

e) applying the water pressure created by the pump (4) in the solenoid valves (1) to means for spraying through the respective outlet pipe (6);

f) cleaning the surface of the solar panel (7) automatically by high water pressure belongs to the means for spraying;

g) closing the solenoid valve (1) after the predetermined time interval;

h) opening other solenoid valves (1) and performing the step (a) to (g).

6. The method for water based automatic solar panel cleaning as claimed in claim 5 wherein step (e), the means for spraying includes a water spraying pipe (6a) and sprayer (8).

7. The method for water based automatic solar panel cleaning as claimed in claim 6 wherein the water spraying pipe (6a) having a water inlet (13) and a spraying section (14).

8. The method for water based automatic solar panel cleaning as claimed in claim 6 wherein the sprayer (8) includes a tubular thread member (9) and a circular member (10).

* * * * *